INVENTOR
MERLE E. MARTIN
BY
ATTORNEYS

INVENTOR
MERLE E. MARTIN

United States Patent Office 3,512,147
Patented May 12, 1970

3,512,147
ANNUNCIATOR SYSTEMS UTILIZING RELAY ACTUATION
Merle E. Martin, Dallas, Tex., assignor to Beta Corporation, Dallas, Tex., a corporation of Texas
Filed Oct. 24, 1966, Ser. No. 588,818
Int. Cl. G08b 7/06
U.S. Cl. 340—213.1
9 Claims

ABSTRACT OF THE DISCLOSURE

A relay circuit includes first and second relay coils, with associated contacts, which are normally energized. The first relay coil is de-energized by the actuation of either normally-closed or normally-open field contacts responsive to monitored conditions, the contacts of both relay coils then effecting activation of a horn and flashing light. Actuation of a manually operable acknowledge switch effects de-energization of the second relay coil, the relay contact effecting deactivation of the horn and bypassing the flasher circuit to effect a continuous light signal. Latching circuits are provided through the contacts of the two relay coils.

---

This invention relates to annunciator systems of the type used for monitoring the operation of multistation processes and equipment and for indicating the presence of abnormal conditions therein, and more particularly to improved annunciator systems of the type employing relays for providing several modes of operation.

Large scale industrial processes or equipment are often monitored from a central control room which is remote from the stations being monitored, and it is common to employ an annunciator system for this purpose, such a system providing visual and audible alert signals when malfunctions occur in the monitored equipment. Annunciator systems used for this type of operation can provide verious operating modes; for example, the system may produce a flashing light and horn signal when an abnormal condition occurs, these signals continuing until the operator acknowledges by pressing a pushbutton. Also, the system may be latching or nonlatching, i.e., the signals may continue even though the abnormal condition ceases, either until reset or until acknowledge. Various other modes may be selected depending upon the equipment being monitored. Annunciator systems have been available which generally provide these functions, but have been needlessly complex, required expensive components such as active electronic circuit elements, and were not readily adaptable for functions other than the specific one for which each system was designed.

It is therefore the principal object of this invention to provide improved and simplified annunciator systems of the type used for monitoring the operations at a large number of stations and for producing alarm signals upon the occurrence of abnormal conditions at the stations, the systems providing a variety of operating modes with minor modifications of a basic system configuration.

In accordance with a particular embodiment of this invention, an annunciator system is provided which includes an indicator unit for each of the stations to be monitored, and the indicator unit being actuated by either normally-open or normally-closed field contacts. Each unit basically uses a pair of relays, one of which is actuated from the field contacts and the other being actuated through an acknowledge switch. The two relays have contacts which are effective to actuate a horn and a lamp when a malfunction occurs for each particular station, the lamp being initially turned on flashing until the operator has acknowledged, then the horn is silenced and the lamp is energized continuously instead of flashing. Latching may be provided by contacts for the two relays to hold the system in the alarm condition even though the abnormal condition on longer exists, either until acknowledge or until reset. All of these functions are provided by relay circuitry which offers greatly simplified construction without sacrifice of versatility in operation.

The novel features which are believed characteristic of this invention are set forth in the appended claims. The invention itself, however, as well as further objects and advantages thereof, will best be understood by reference to the following detailed description of particular embodiments, read in conjunction with the accompanying drawings, wherein:

FIG. 4 is a simplified schematic diagram of the annunciator system of FIG. 3 presented as an aid in understanding the operation of this embodiment;

FIG. 6 is a simplified schematic diagram of the annunciator system of FIG. 5.

Figure 1:
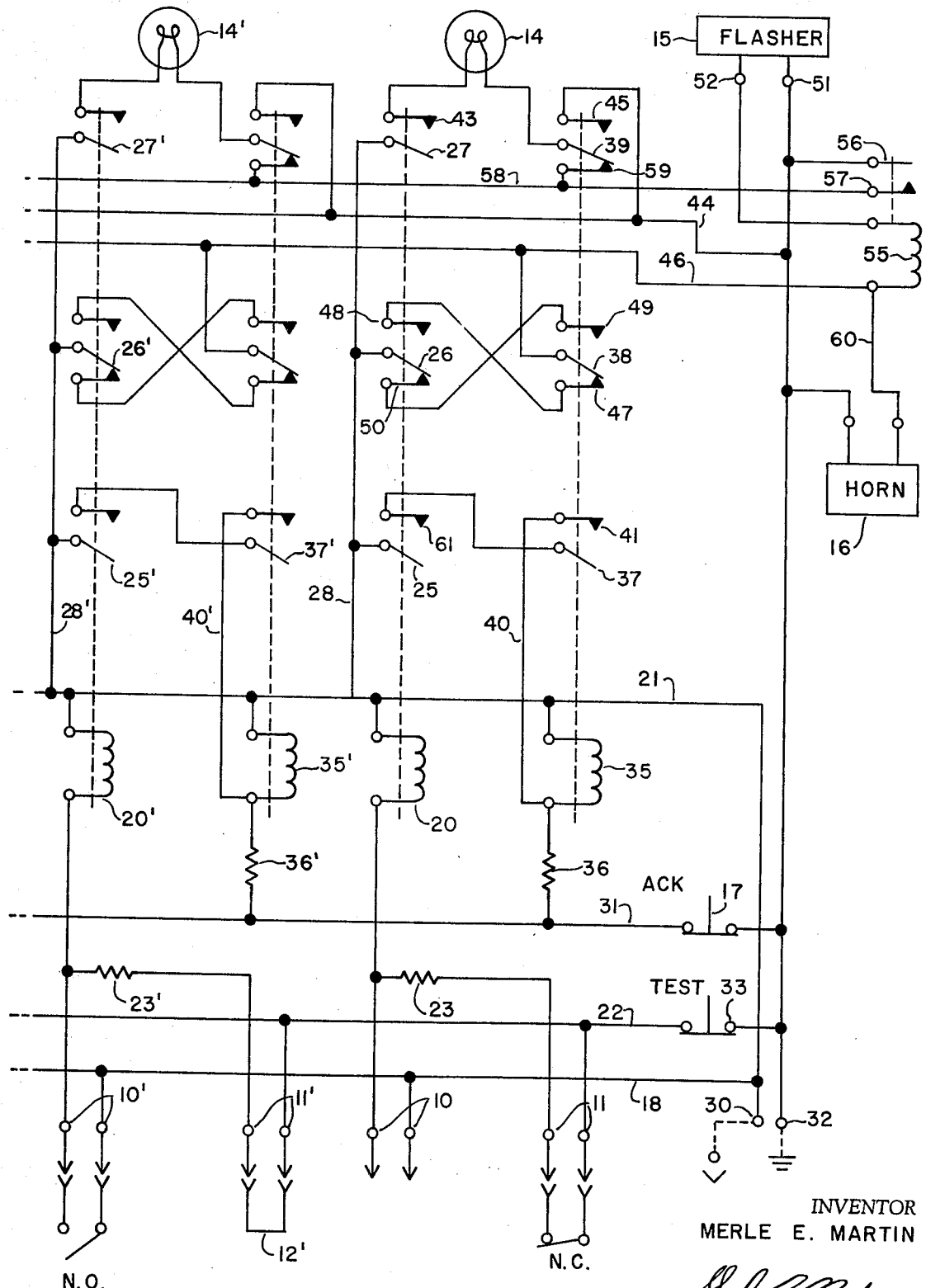
FIG. 1 is a schematic diagram of an annunciator system in accordance with one embodiment of the invention.

With reference to FIG. 1, an annunciator system providing the improved functions of this invention is illustrated in schematic diagram form. In such a system, a large number of stations or units are provided for the purpose of detecting the presence of selected abnormal conditions or malfunctions in a system which is to be monitored. Typically, an annunciator of this type is used to monitor operations such as may exist in utility plants, chemical processing plants and the like. A separate one of the stations or units would be associated with each condition to be monitored. Ordinarily, the conditions or variables of interest would be items such as pressure, temperature, liquid level, motor speed, fluid flow, etc. When such condition are abnormally low or high, the units of the annunciator are individually actuated by the opening or closing of electrical contacts or switches in the equipment being monitored. The first unit in the system of FIG. 1 is shown having a pair of terminals 10 for connection to normally-open field contacts and a pair of terminals 11 for connection to normally-closed field contacts. The second unit likewise includes terminals 10' and 11' for connection to field contacts. As will be apparent, any number of units exactly like the two shown in FIG. 1 could be connected to the bus lines of the system. If normally-closed field contacts are used, the terminals 10 are left open, while if normally-open field contacts are used as seen in the second unit, then the terminals 11' are connected together with a jumper 12'. Each unit of the system of FIG. 1 is activated, or detects abnormal conditions, by the opening of normally-closed contacts or the closing of normally-open contacts, either of which will be considered to be a malfunction or alert. Upon the occurrence of a malfunction detected at the terminals 10 or 11 in any of the units, a lamp 14 will turn on in each such unit. The lamps 14, 14', etc., will initially come on flashing due to the operation of an interrupter 15. Also, an audible signal such as a horn 16 will be actuated when any one of the units detects an abnormal condition. The horn is silenced and the lamps 14 changed from flashing to continuous by depressing an acknowledge button 17. After the operator has acknowledged by pressing the button 17, if the abnormal condition ceases to exist, the lamp will turn off and the circuit returns to its original state.

Considering the circuit of FIG. 1 in more detail, it will be noted that the terminals 10 for normally-open field contacts are connected between an input voltage bus line 18 and one terminal of a relay coil 20. The other terminal of this relay coil is connected to another input voltage buse line 21, it being seen that closing of normally-open field contacts connected to the terminals 10 will short the coil 20 and prevent it from being energized. The terminals 11 for connection to normally-closed field contacts are connected between a common or ground bus line 22 and the lower terminal of the relay coil 20, a resistor 23 being connected in this path. It will thus be seen that the relay coil 20 will be energized through normally-closed contacts connected to the terminals 11 until such contacts are opened by an abnormal condition. The relay coil 20 actuates three moving contacts 25, 26 and 27, these contacts being shown in the drawing in the lower position since in the condition shown the coil 20 will be energized. The moving contacts 25-27 are all connected to the input voltage bus line 21 by a line 28.

The input voltage bus lines 18 and 21 are both connected to an input voltage terminal 30 for the system while the common bus line 22, along with another ground or common bus line 31, is connected to a ground or common terminal 32 for the system. The bus line 31 is connected in series with a normally-closed pushbutton switch 33 which provides a test function as will be explained below. Another relay coil 35 is connected in series with a resistor 36 between the common line 31 and the voltage bus line 21 so it is seen that this relay coil 35 will be energized until the acknowledge button 17 is depressed, or may be de-energized by the operation of the relay contacts as will subsequently appear.

The relay coil 35 actuates three movable contacts 37, 38 and 39, these being shown in the down position since the coil 35 is energized. The relay coil 35 may be shorted out if both the coil 20 and the coil 35 are de-energized by a path from the lower terminal of the coil 35 through a line 40, the contacts 41 and 37, a line 42, and on to the input bus line 21 through the contact 25 and the line 28.

With the armatures 27 and 39 in the lower positions as shown, it is noted that the lamp 14 will not be energized since the moving contact 27 does not engage the contact 43. If both relay coils 20 and 35 were de-energized, the lamp 14 would be energized by a path from a common bus line 44 through the upper contact 45, the moving contact 39, the contact 43, the moving contact 27 on to the line 28 and the input voltage bus line 21. Alternatively, the lamp may be caused to flash as will subsequently appear.

The circuit for actuating the horn 16 includes a bus line 46 connected to the moving contact 38 which is connected through the contact 26 to the input voltage line 21 for energizing the horn. The other terminal of the horn is connected to the ground terminal 32, so the horn will be energized whenever a path exists through the moving contacts 26 and 38. The lower contact 47 for the moving contact 38 is connected to the upper contact 48 for the moving contact 26, while the upper contact 49 for the contact 38 is connected to the lower contact 50 for the contact 26. With this arrangement, it is noted that the horn will be energized when the contact 38 is in the lower position and the contact 26 is in the upper position, or when the contact 38 is in the upper position and the contact 26 is in the lower position. Thus, the horn is activated when one of the relay coils 20 and 35 is energized and the other de-energized.

The flasher unit 15, which may be merely a thermally operated bimetallic interrupter of conventional form, has one terminal 51 connected to the ground terminal 32 and so will be energized whenever the other terminal 52 is connected to the input voltage line. This terminal 52 is connected through a relay coil 55 to the bus line 46 which, as noted above, is also used in actuating the horn 16. The line 46 is connected to the voltage line 21 when the relay coil 20 is de-energized and the relay coil 35 energized, or vice versa. When the flasher 15 is energized, the relay coil 55 will also be energized, alternately opening and closing a pair of contacts 56 and 57 which are in series between the ground tarminel 32 and a bus line 58. If the moving contact 27 engages the contact 43, the lamp 14 can be energized from the bus line 44 through the contact 45 if the coil 35 is de-energized, or from the bus line 58 through the contact 59 if the relay coil 35 is energized and the coil 55 is energized. In this manner, as will be explained below, the lamp 14 may be turned on either flashing or continuous.

It is, of course, understood that the second station including the terminals 10' and 11' and relays 20' and 35', etc., as well as any number of subsequent stations, will be constructed and will operate just the same as the circuit just described.

Figure 2:
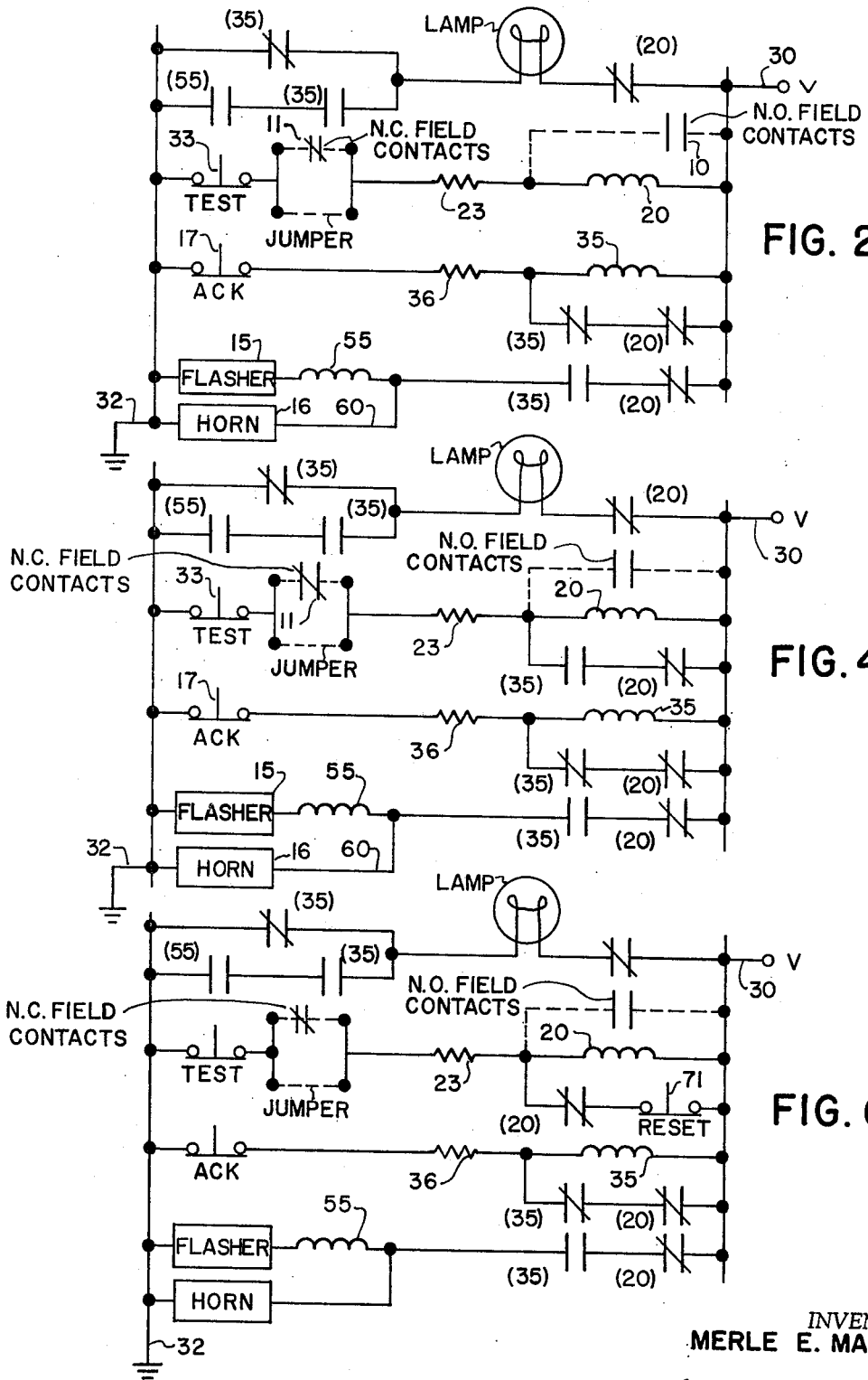
FIG. 2 is a simplified schematic diagram of the annunciator system of FIG. 1 provided as an aid in understanding the operation of the circuit of FIG. 1.

The operation of the annunciator system of FIG. 1 may best be understood by reference to FIG. 2 which is a simplified schematic diagram wherein the same reference numerals are used as in the description of FIG. 1. It is noted that the contacts are designated by the reference numeral in parentheses for the relay coil which actuates them. In operation, when power is applied between the terminals 32 and 30 and no alert or abnormal condition exists, i.e., when all field contacts are normal, the relay coil 20 is energized from the ground terminal 32 through the path including the test switch 33, the normally-closed contacts across the terminals 11, the resistor 23 and the voltage supply terminal 30. The relay coil 35 is energized from the ground line 32 through the acknowledge switch 17, the resistor 36 to the supply line 30. The control relay coil 55 is de-energized, and the lamps 14 along the horn 16 and the flasher circuit 15 are not actuated.

When an abnormal condition exists, it causes the normally-closed field contacts across terminals 11 to open, thus de-energizing the relay coil 20. Similarly, for stations using normally-open field contacts connected to the terminals 10, 10', etc., the relay 20 or 20' would be de-energized since it would be shunted when the normally-open contacts closed, as will be seen in FIG. 2. When the coil 20 is de-energized, the horn 16 is energized by the voltage applied to the line 60 through the contacts 26 and 48, which are closed since the relay coil 20 is de-energized, and through the contacts 38 and 47, which are closed since the relay coil 35 is energized. This voltage is also applied to the flasher 15 through the coil 55 so that the flasher opens and closes repeatedly, thus energizing and de-energizing the coil 55. The appropriate lamps 14 now flash through the circuit consisting of the contacts 56 and 57 which alternately open and close, the contacts 39 and 59 which are closed since the relay 35 is energized, the lamp 14, and contacts 43 and 27 which are closed since the coil 20 is de-energized.

When the operator acknowledges the alert by momentarily depressing the acknowledge switch 17, then the circuit between the common terminal 32 and the relay coil 35 is opened, de-energizing the relay coil 35. The relay coil 35 remains de-energized because of the latching circuit established through the contacts 25 and 61 which are closed because the coil 20 is de-energized, and through the contacts 41 and 37 which are closed because the coil 35 is de-energized, assuming the alert or abnormal condition still exists. The lamps 14 are now on continuously, instead of flashing, through the circuit formed by the contacts 45 and 39 which are closed since the relay coil 35 is de-energized, and through the contacts 43 and 27 which are closed as the coil 20 is de-energized. The flasher 15 and the horn 16 are de-energized as a result opening of the contacts 38 and 47 since the coil 35 is now de-energized.

If the alert now returns to normal after acknowledge, the relay coil 20 is energized. The contacts 25 and 61 open, which opens the latching circuit across the relay coil 35 so that this relay coil is now energized. Thus, the circuit has returned to its original or normal state with the relay coils 20 and 35 energized.

It is thus seen that the annunciator system of FIG. 1 provides an improved, simplified circuit using relays to produce non-latching operation, that is the indicator lamps flash so long as an alert exists, but when the alert clears the system returns to normal. Acknowledgement causes the lamps to be on continuously instead of flashing and silences the horn. It is important to note that this basic system as described with reference to FIGS. 1 and 2 may be modified with slight changes to produce a latching function, either before acknowledge or before and after acknowledge. By latching is meant that the system remains in the alert condition until acknowledge or reset even though the field contacts return to normal. The modifications to the circuit of FIG. 1 to provide these functions will now be described.

Figure 3:
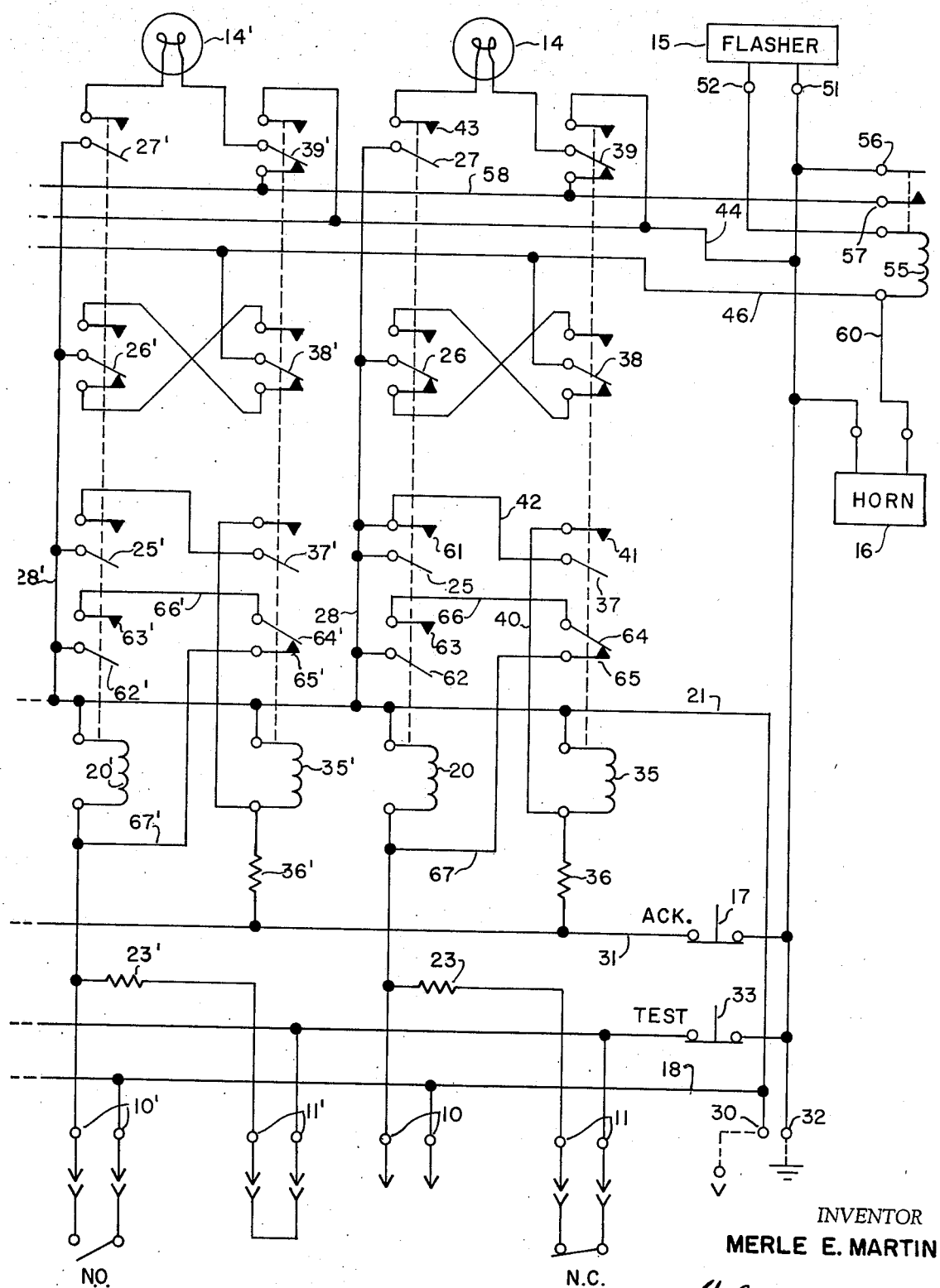
FIG. 3 is a schematic diagram of an annunciator system in accordance with another embodiment of the invention.

With reference to FIG. 3, a detailed schematic diagram of the relay annunciator system according to this invention is illustrated, modified to produce the latching before acknowledge function. All of the parts of the system of FIG. 3 which are exactly the same as that of FIG. 1 bear the same reference numerals as in FIG. 1. Thus, the terminals 10 and 11, 10' and 11', relay coils 20, 35 and 55, the bus lines 18, 21, 22, 31, etc., the lamps 14, 14', the flasher 15 and horn 16, etc., all are the same in FIG. 3 as in FIG. 1. The circuitry added to the system of FIG. 3 to provide the latching operation includes a moveable contact 62 operated by the relay coil 20, its stationary contact 63, and a moveable contact 64 operated by the relay coil 35 along with its stationary contact 65. The contact 63 is connected to the contact 64 by a jumper 66, while the contact 65 is connected to the lower terminal of the coil 20 by a line 67. This arrangement is effective to short the coil 20, preventing it from being energized, whenever the coil 35 is energized and the coil 20 de-energized, i.e., when contacts 62-63 and 64-65 close.

In operation, as will be seen by reference to FIG. 4, the circuit of FIG. 3 closely resembles that of FIG. 1. When all field contacts are normal, the relay coils 20 and 35 are energized, the coil 55 is de-energized, and the lamps, horn and flasher are de-energized. The occurrence of an abnormal condition causes the coil 20 to be de-energized, resulting in actuation of the lamp 14 through the flasher 15 and of the horn 16 as before. In addition, however, it is noted that the relay coil will be latched in the de-energized condition due to the shorting path from the line 28 through the contacts 62-63, the line 66, the contacts 64-65, and the line 67. So long as the coil 35 remains energized, the coil 20 will remain de-energized even though the field contacts return to normal. When the acknowledge button 17 is depressed, the horn will silence and the lamp will change from flashing to continuous, just as before, while in addition the latching circuit will be opened so that if the field contacts return to normal after acknowledge the entire circuit will return to its original state, i.e., lamp off and horn silent.

Figure 5:
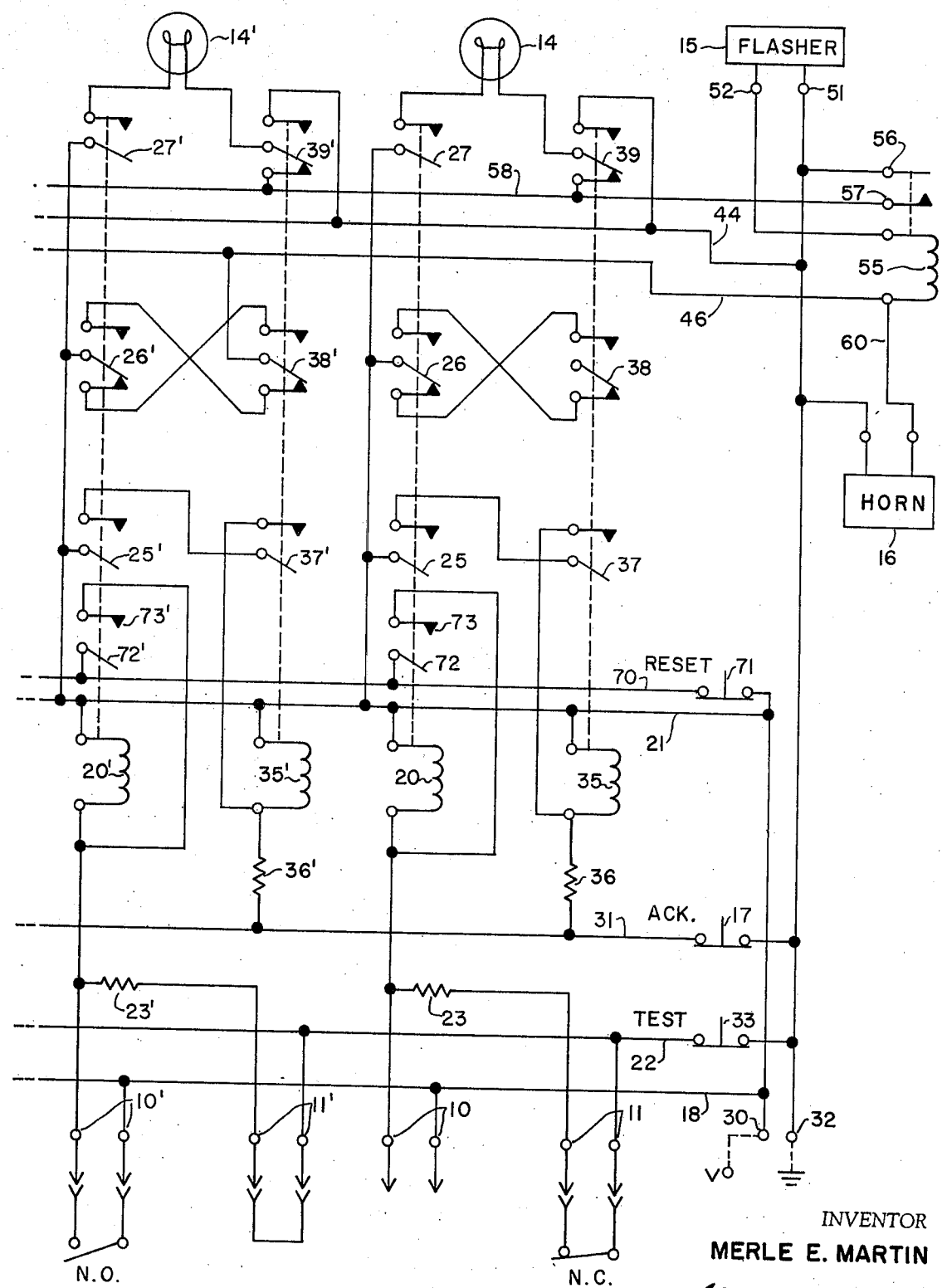
FIG. 5 is a schematic diagram of an annunciator system in accordance with still another embodiment of the invention.

With reference now to FIG. 5, an annunciator circuit is shown which provides the latching function both before and after the operator has acknowledged, rather than only before as in the system of FIG. 3. The circuit of FIG. 5 is very similar to that of FIG. 1, and it will be noted that all of the circuit elements which are the same in both circuits bear the same reference numerals. In addition, however, the circuit of FIG. 5 includes a reset bus line 70 which is connected to the supply terminal 30 through a normally-closed pushbutton 71. A moveable contact 72 operated by the relay coil 20 is connected to this line 70, while the fixed contact 73 is connected to the lower terminal of the coil 20. Since the line 70 is connected to the line 21, the coil 20 will be shorted or de-energized whenever the contacts 72-73 close and will remain in this condition until the reset button 71 is depressed, regardless of whether or not the field contacts remain abnormal or whether or not the acknowledge switch 17 is opened. Of course, acknowledging will change the actuation of the lamp from flashing to continuous and silence the horn just as described above. This mode of operation of the circuit of FIG. 5 will be apparent from FIG. 6.

What is claimed is:

1. An annunciator system comprising:

first and second relay coils, an electrical supply having a pair of terminals, means connecting said first relay coil across the terminals of said supply to energize said coil, a plurality of terminals coupled to said first coil for connection to normally-open or normally-closed field contacts and effective to control the energization of said first coil to first and second states as a function of said field contacts being, respectively, in a normal or abnormal condition, means including an acknowledge switch connecting said second relay coil across said terminals of said supply, said second relay coil normally energized to a first state and being energized to a second state through actuation of said acknowledge switch, first relay contact means operated by said first relay coil and second relay contact means operated by said second relay coil connected in series and to said second coil, being effective to maintain said second coil in its second state independently of said acknowledge switch when said first coil is in its second state, first indicator means connected to said pair of supply terminals in series with third relay contact means operated by said first relay coil and also in series with fourth relay contact means operated by said second coil, effective to activate said first indicator means when said first and second relay coils are in said second state, second indicator means connected to said pair of supply terminals in series with fifth relay contact means operated by said first relay coil and also in series with sixth relay contact means operated by said second relay coil, said fifth and sixth contact means being effective to activate said second indicator means when said first relay coil is in its second state and said second relay coil is in its first state, a third relay coil connected in series with said fifth and sixth relay contact means, seventh relay contact means operated by said third relay coil and eighth relay contact means operated by said second relay coil connected in series and across said forth relay contact means, whereby when said first and second relay coils are in their respective first states neither of said first and second indicating means is activated, and after said first relay coil is in its second state in response to the abnormal condition of said field contacts both the first and second indicating means activated, while actuating said acknowledge switch causes said second coil to be energized to its second state whereby said first indicating means remains activated and the second indicating means is de-activated, and ninth relay contact means operated by said second coil and tenth relay contact means operated by said first coil connected in series and to said first coil being effective to maintain said first relay coil in said second state when said field contacts return to a normal condition prior to actuation of said acknowledge switch, the actuation of said acknowledge switch effecting the energization of said first relay coil to its first state.

2. An annunciator system according to claim 1 wherein interrupter means is connected in series with said third relay coil whereby said seventh relay contact means is periodically opened and closed at a rate such that perceptable interruption of the activation of the first indicator means is provided.

3. An annunciator system according to claim 2 wherein the first indicator means includes a lamp and the second indicator means includes an audible signal device.

4. An annunciator system according to claim 1 wherein eleventh normally-closed relay contact means operated by said first relay coil and a normally-closed reset switch are connected in series whereby the first relay coil is latched in its second state, opening of said reset switch releasing the latching of said first relay coil.

5. An annunciator system according to claim 1 wherein interrupter means is connected in series with said third relay coil whereby said seventh relay contact means is periodically opened and closed at a rate such that perceptable interruption of the activation of the first indicator means is provided.

6. An annunciator system according to claim 4 wherein interruption means is connected in series with said third relay coil whereby said seventh relay contact means is periodically opened and closed at a rate such that perceptable interruption of the activation of the first indicator means is provided.

7. An annunciator system according to claim 5 wherein the first indicator means includes a lamp and the second indicator means includes an audible signal device.

8. An annunciator system according to claim 6 wherein the first indicator means includes a lamp and the second indicator means includes an audible signal device.

9. An annunciator system according to claim 1 wherein said first and second relay coils are initially energized, said first state of said coils being the energized state existing when said field contacts are in the normal condition.

References Cited

UNITED STATES PATENTS 2,824,295 2/1958 Zaruba _____ 340—213.1
3,234,541 2/1966 Paull _____ 340—213.1 X JOHN W. CALDWELL, Primary Examiner
C. M. MARMELSTEIN, Assistant Examiner U.S. Cl. X.R.
317—139